United States Patent
Binder et al.

[11] 3,855,486
[45] Dec. 17, 1974

[54] STEP MOTOR

[75] Inventors: Wilhelm Binder; Rudolf Hauer, both of Villingen; Edmund Bausch, Kirchen-Hausen, all of Germany

[73] Assignee: Binder Magrete GmbH, Villingen, Germany

[22] Filed: Oct. 11, 1973

[21] Appl. No.: 405,645

[30] Foreign Application Priority Data
Oct. 11, 1972  Germany.......................... 2249729

[52] U.S. Cl................ 310/49, 310/216, 310/254
[51] Int. Cl............................................. H02k 37/00
[58] Field of Search............ 310/49, 112, 254, 258, 310/259, 89

[56] References Cited
UNITED STATES PATENTS

| | | | |
|---|---|---|---|
| 3,043,971 | 7/1962 | Stevens.......................... | 310/254 X |
| 3,293,469 | 12/1966 | Crawford et al................ | 310/254 X |
| 3,372,291 | 3/1968 | Lytle et al...................... | 310/49 |
| 3,469,123 | 9/1969 | Inaba et al..................... | 310/49 |
| 3,693,034 | 9/1972 | Inariba........................... | 310/49 |

*Primary Examiner*—Donovan F. Duggan
*Attorney, Agent, or Firm*—Waters, Roditi, Schwartz & Nissen

[57] ABSTRACT

A step motor, which essentially consists of a plurality of axially serially positioned, electrically excitable stator systems, and a rotor which is associated therewith. The pole pieces of the stator systems, or respectively the rotor sections, are so offset relative to each other whereby the rotor, upon a sequentially effected excitation of the stator systems, is displaced in rotary motion. The motor has a yoke located between the stator pole discs in the form of two half shells extending coaxially relative to the rotor axis, and the yoke and/or the stator pole discs are formed of sheet metal laminate or the like, and respectively two stator pole discs in conjunction with a half shell-shaped yoke and ring coil form a stator system.

19 Claims, 2 Drawing Figures

STEP MOTOR

FIELD OF THE INVENTION

The present invention relates to a step motor, also referred to as a step switch motor, which essentially consists of a plurality of axially serially positioned, electrically excitable stator systems, and a rotor which is associated therewith.

The pole pieces of the stator systems, or respectively the rotor sections, are so offset relative to each other whereby the rotor, upon a sequentially effected excitation of the stator systems, is displaced in rotary motion. An important advantage of the step motor lies in that the rotor is conveyed in dependence of stator excitation into precisely predetermined angular positions and retained therein. Consequently, the motor is primarily suitable as a servomotor for control purposes and the like.

DISCUSSION OF THE PRIOR ART

In the prior art, a plurality of step motors have become known which operate in accordance with the above-described system which, however, in part due to their complicated construction, their low degrees of efficiency and limited applicabilities, have found application in practice only within narrow confines.

The present invention emanates as an improvement from German Pat. No. 1,158,624 which discloses a step motor having a plurality of axially serially positioned stator systems, which include a stator coil extending coaxially with the rotor axis, and stator pole discs on both sides of the stator coil which are interconnected by means of a yoke and having radially directed pole pieces; as well as including a rotor having pole pieces associated with the stator pole pieces, and which is rotatably supported between bearing support plates closing off both sides of the stator systems.

In this known step motor as a yoke for all systems there is provided a hollow cylinder, in which there are positioned so as to form the stator, the stator pole discs and the stator coil. The stator pole discs and the yoke are constructed of a solid material.

A drawback in this apparently relatively simply constructed system lies in the yoke which is common to all systems and which is in the form of a massive hollow cylinder, which requires a considerable stray flow with respect to each of the individual systems. Furthermore, the air gaps, which are of necessity present between the stator pole discs and the hollow cylinder serving as the yoke, cause a considerable magnetic resistance, which either leads to high losses or requires an extremely precise and consequently expensive construction. The losses of this known step motor are further increased in that, in view of the massive construction of the stator pole discs and of the yoke, there are generated considerable turbulent streams which exert an influence over the main magnetic flow thereby reducing the torque moment and influencing the magnetic field build-up and decrease.

SUMMARY OF THE INVENTION

Accordingly, the present invention has as an object the avoidance of the disadvantages encountered in the prior art, in effect, to provide a step motor of the previously mentioned type which, notwithstanding its simple construction, possesses an increased torque moment. Furthermore, there is applied a principle of construction, in accordance with which through only a few basic components there may be produced step motors of varied dimensions and capacities in conformance with a particular utilization thereof so as to simplify the construction and storage is simplified, and consequently reduce manufacturing costs.

In accordance with the present invention this task is inventively solved in that the yoke located between the stator pole discs is in the form of two half shells extending coaxially relative to the rotor axis, and that the yoke and/or the stator pole discs are formed of sheet metal laminate or the like, and that respectively two stator pole discs in conjunction with a half shell-shaped yoke and a ring coil form a stator system.

In an arrangement of that type, the main magnetic flow remains essentially restricted to the particular stator system and the therewith associated rotor section whereby there occurs only a minute stray flow. Through the employment of laminated sheet metal for the stator pole discs and/or the yoke, the turbulent flow losses are also considerably reduced. Overall, the inventive step motor possesses, in comparison with the state of the art, an increased torque moment and a shorter magnetic field build-up and decrease time.

A further advantage of the present motor lies in that the individual stator systems in almost any quantity, may be serially assembled with each other, whereby step motors of this type may be constructed by an assembly of prefabricated components. Additionally, the construction costs thereof are thereby also reduced, since in contrast to solid stator pole discs, the sheet metal required for the laminated stator pole discs may be stamped out of commercially available transformer sheet metal.

It is also possible to provide solidly formed stator pole discs and to only make the yoke of a laminated construction. However, in order to further simplify the construction, it is proposed that the yoke and the stator pole discs be constructed so as to be attachable to each other, and to interconnect them by bolting, riveting, adhesives or in a similar manner, for example, soldering or welding to each other. In a similar manner, the stator systems also may themselves be made attachable and fastenable to each other so that the manufacturer need only maintain a quantity of stator systems in storage, which may be assembled in conformance with customer requirements into the required step motors within the shortest possible time. The rotor of the inventive step motor may be formed either solidly and a single piece or, in conformance with the number of stator systems, be constructed of a plurality of pieces, in which the rotor in both instances includes pole pieces associated with the stator pole pieces. In a multi-piece rotor, the rotor elements may similarly be assembled and interconnected by riveting, adhesives, or in similar manner attached to each other.

In order to maintain the stray flow of each system as low as possible, it is recommended that for magnetic decoupling there are inserted between the rotor elements and/or the stator systems, discs formed of a non-magnetic material, for example, copper, bronze, aluminum or the like. These intermediate positioned discs may advantageously also be constructed so as to provide for the centering of the assembled stator systems and, respectively, rotor elements.

In accordance with the inventive teaching it is possible to utilize identically constructed stator systems, in which the pole pieces of the stator metal sheets are in alignment with each other, when the rotor pole pieces associated with particular stator systems are positioned offset relative to each other. Suitably, the rotor is herein constructed of individually identical rotor elements, which upon being joined together are offset relative to each other through a required angle. It is, however, also possible to contemplate a single-piece rotor in which corresponding grooves which are offset relative to each other are formed for the construction of mutually offset pole pieces, for example, ground into the rotor.

In a similar manner it is also possible to utilize a single-piece rotor having through-extending, axially parallel pole pieces when, in accordance with a further proposal of the invention, the stator systems are provided with relatively offset pole pieces.

BRIEF DESCRIPTION OF THE DRAWING

The invention may be more readily understood in the description of an exemplary embodiment which is schematically illustrated in the drawing, and in which.

DETAILED DESCRIPTION

Figure 2:
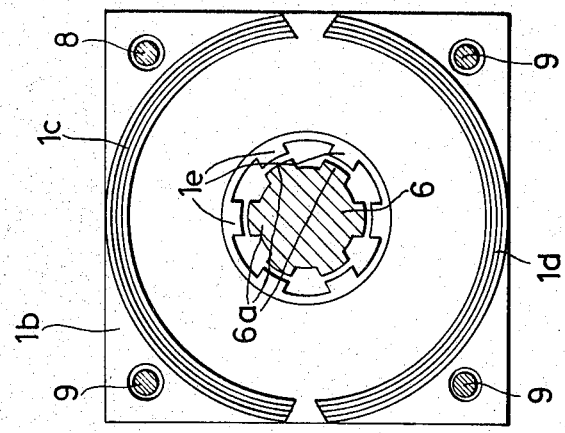
FIG. 2 is a transverse section taken along line II—II in FIG. 1.
Figure 1:
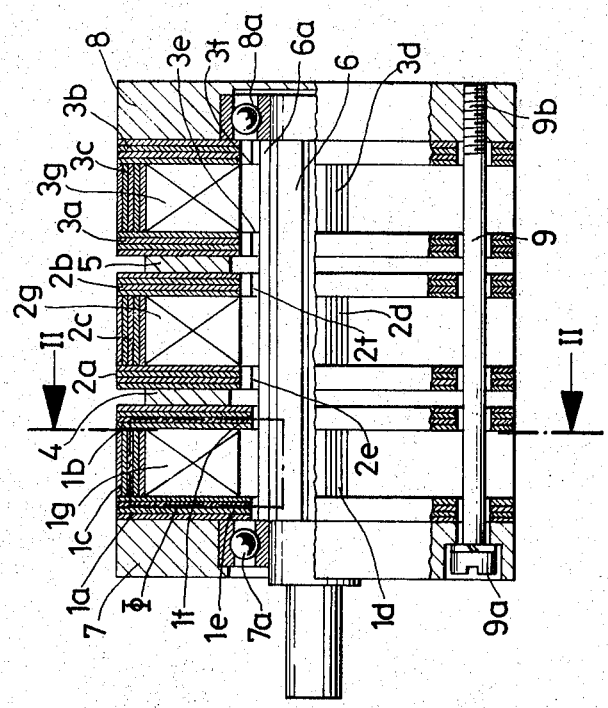
FIG. 1 is a longitudinal sectional view of a step motor according to the invention.

The inventive step motor as shown in FIG. 1 is assembled of three stator systems having laminated stator pole discs $1a$, $1b$, $2a$, $2b$, $3a$, $3b$; half shell-shaped yokes $1c$, $1d$, $2c$, $2d$ and $3c$, $3d$ similarly formed of sheet metal laminate; and concentrically wound stator coils $1g$, $2g$, and $3g$. Intermediate each of the adjacent pole discs, in effect, pole discs $1b$ and $1a$, and respectively $2b$ and $3a$, there are provided discs 4 and 5 which are formed of a non-magnetic material, and by means of which stray flow between the systems is largely prevented, so that the main flow $\Phi$, which is shown in system 1 through chain-dotted lines, is operative only in that particular system. In that manner the torque moment is increased and the operative characteristics improved.

The rotor 6, which is common for all systems, and which includes through-extending axially parallel pole pieces $6a$, is freely rotatably supported in ball or bearing supports $7a$ and $8a$, the latter of which are positioned in complementary recesses formed in cover discs 7 and 8, respectively.

The stator pole discs include, on their sides facing toward the rotor 6, radially directed pole pieces $1e$ and $1f$, $2e$ and $2f$, $3e$ and $3f$, whose number corresponds to the number of rotor pole pieces which, however, are displaced relative to each other about one-third of the pole distribution.

In a manner not disclosed in the drawing, the half shells $1c$ and $1d$, $2c$ and $2d$, $3c$ and $3d$ are connected with the respective proximate stator pole discs $1a$ and $1b$, $2a$ and $2b$, $3a$ and $3b$, preferably by riveting. Upon assembly of the stator systems into a stator block, the intermediate discs 4 and 5 which provide for the magnetic decoupling concurrently serve as centering discs so as to impart to the individual stator systems the required relative angle for effecting functioning of the motor. For the assembly of, in this instance a stator block formed by three stator systems, there are provided four screw bolts 9 which extend through corresponding bores in the stator pole sheet metal, and having threaded portions $9b$ which engage with a complementary threaded bore of the one support disc 8, and whose head portions $9a$ are located within recesses in the other support disc 7, as may be ascertained from the lower half of the section of FIG. 1.

Notwithstanding its advantageous electrical properties, the construction of the inventive motor is so simple as to facilitate an economical mass production, and furthermore allows for extensive modifications with the aid of similarly constructed elements.

While there has been shown what is considered to be the preferred embodiment of the invention, it will be obvious that modifications may be made which come within the scope of the disclosure of the specification.

What is claimed is:

1. In a step motor comprising a plurality of axially serially positioned stator systems, said systems including a stator coil extending coaxially with a rotor axis, stator pole discs positioned at opposite sides of said stator coil, said stator pole discs having radially extending pole pieces, and a yoke interconnecting said stator pole discs; a rotor having pole pieces associated with said stator pole pieces, said rotor being rotatably supported at both ends thereof on stator bearing discs encompassing the ends of said stator systems, the improvement comprising; said yoke intermediate said stator pole discs being a pair of half shells extending coaxially with the rotor axis and being formed of concentric half shell-sheet metal laminae, two said stator pole discs, said half shell-shaped yoke and a ring-shaped stator coil constituting one said stator system; and discs of a nonmagnetic material being interposed between adjacent of said detachably interconnected stator systems, said discs forming spacer and centering means for said stator systems.

2. An improvement as claimed in claim 1, said yoke being formed of sheet metal laminae and said stator pole discs being of solid construction.

3. An improvement as claimed in claim 1, said yoke and said stator pole discs being attachable, and means for fixedly attaching said yoke and stator pole discs.

4. An improvement as claimed in claim 3, said attaching means comprising screw bolts.

5. An improvement as claimed in claim 3, said attaching means comprising rivets.

6. An improvement as claimed in claim 3, said attaching means comprising adhesives.

7. An improvement as claimed in claim 1, comprising means for attaching and fixedly fastening together said plurality of stator systems.

8. An improvement as claimed in claim 4, said fastening means comprising rivets.

9. An improvement as claimed in claim 4, said fastening means comprising adhesives.

10. An improvement as claimed in claim 7, said fastening means comprising screw bolts.

11. An improvement as claimed in claim 1, said rotor having axially parallel extending pole pieces being of single-piece solid construction.

12. An improvement as claimed in claim 1, said rotor having axially parallel extending pole pieces being formed of a plurality of components.

13. An improvement as claimed in claim 1, said plurality of rotor components being attachable; and means for fixedly fastening together said rotor components.

14. An improvement as claimed in claim 12, said fastening means comprising adhesives.

15. An improvement as claimed in claim 12, said fastening means comprising rivets.

16. An improvement as claimed in claim 15, said fastening means comprising screw bolts.

17. An improvement as claimed in claim 1, comprising discs of a non-magnetic material being interposed between said rotor components, said discs forming centering means for said rotor components.

18. An improvement as claimed in claim 1, said stator system pole pieces being in alignment with each other, and the rotor pole pieces associated with respective stator systems being offset relative to each other.

19. An improvement as claimed in claim 1, said stator system pole pieces being offset relative to each other, and the rotor pole pieces being in alignment with each other.

* * * * *